Sept. 6, 1938.    C. S. VAN SICKLE    2,129,453
SOIL DISRUPTER
Filed April 12, 1937    3 Sheets-Sheet 1

INVENTOR,
CHARLES S. VAN SICKLE, DECEASED
BY MYRA V. VAN SICKLE, ADMX.
By Herbert E. Smith
Attorney Sept. 6, 1938.　　C. S. VAN SICKLE　　2,129,453
SOIL DISRUPTER
Filed April 12, 1937　　3 Sheets-Sheet 2
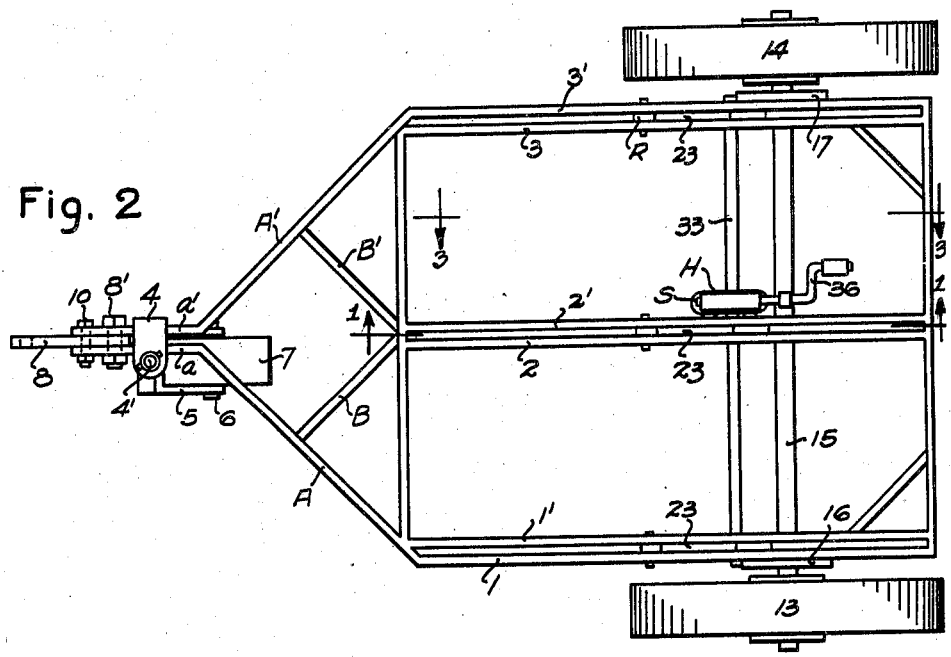
Fig. 2
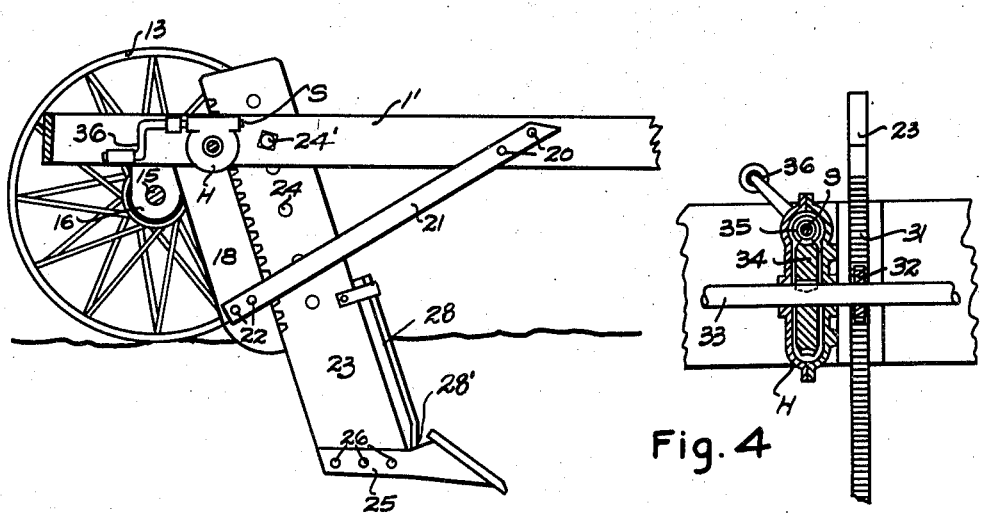
Fig. 3
Fig. 4
INVENTOR,
CHARLES S. VAN SICKLE, DECEASED,
BY MYRA V. VAN SICKLE, ADMX.
By Herbert E. Smith
Attorney Patented Sept. 6, 1938

2,129,453

UNITED STATES PATENT OFFICE 2,129,453

SOIL DISRUPTER

Charles S. Van Sickle, deceased, late of Creston, Wash., by Myra A. Van Sickle, administratrix, Creston, Wash.

Application April 12, 1937, Serial No. 136,324

1 Claim. (Cl. 97—78)

The present invention relates to an improvement in soil disrupters or sub-soil plows, and more particularly to the means employed in adjusting and regulating the plow to different depths in the soil at which the plow is to operate.

It has been found in the past that in periods of drought, the soil at a depth of from six to eight inches below the surface becomes hardened, due to the pressure of continued plowing, to such a degree that ordinary plowing will not break up the hard-packed earth and merely loosens the top soil. Moisture in the form of rain or other precipitation settles through the top soil, and when reaching the hard packed earth commonly known as "hard pan" will run off over the surface of the "hard pan" following the contours of the earth's surface.

The little moisture retained in the top soil soon is evaporated by action of sun and wind, and the earth becomes powdery and subject to removal by winds, thereby causing dust storms, and denude the fields of the fertile and plant-life supporting top-soil.

It is therefore an object of the invention to provide a sub-soil plow which will successfully break up the "hard pan" thereby permitting the moisture passing through the top soil to seep into the sub-soil strata.

Experiments have shown that, after the use of the disrupter according to the invention, moisture will penetrate to the sub-soil strata and will thereafter be gradually withdrawn to the top-soil during dry periods, thereby maintaining the top soil in condition to support plant-life and also preventing the top-soil from being removed by winds.

The invention consists in certain novel combinations and arrangements of parts as will be hereinafter more fully set forth and claimed. In the accompanying drawings there is illustrated one complete example of the physical embodiment of the invention wherein the parts are combined and arranged according to one mode thus far devised for the practical application of the principles of the invention, but it will be understood that changes and alterations may be made in the exemplified structure, within the scope of the appended claim, without departing from the principles of the invention.

Fig. 2 is a top plan view of the implement.

Fig. 3 is a partial vertical sectional view taken at line 3—3 of Fig. 2.

Fig. 4 is a detail view of the plow elevating mechanism.

Figure 1:
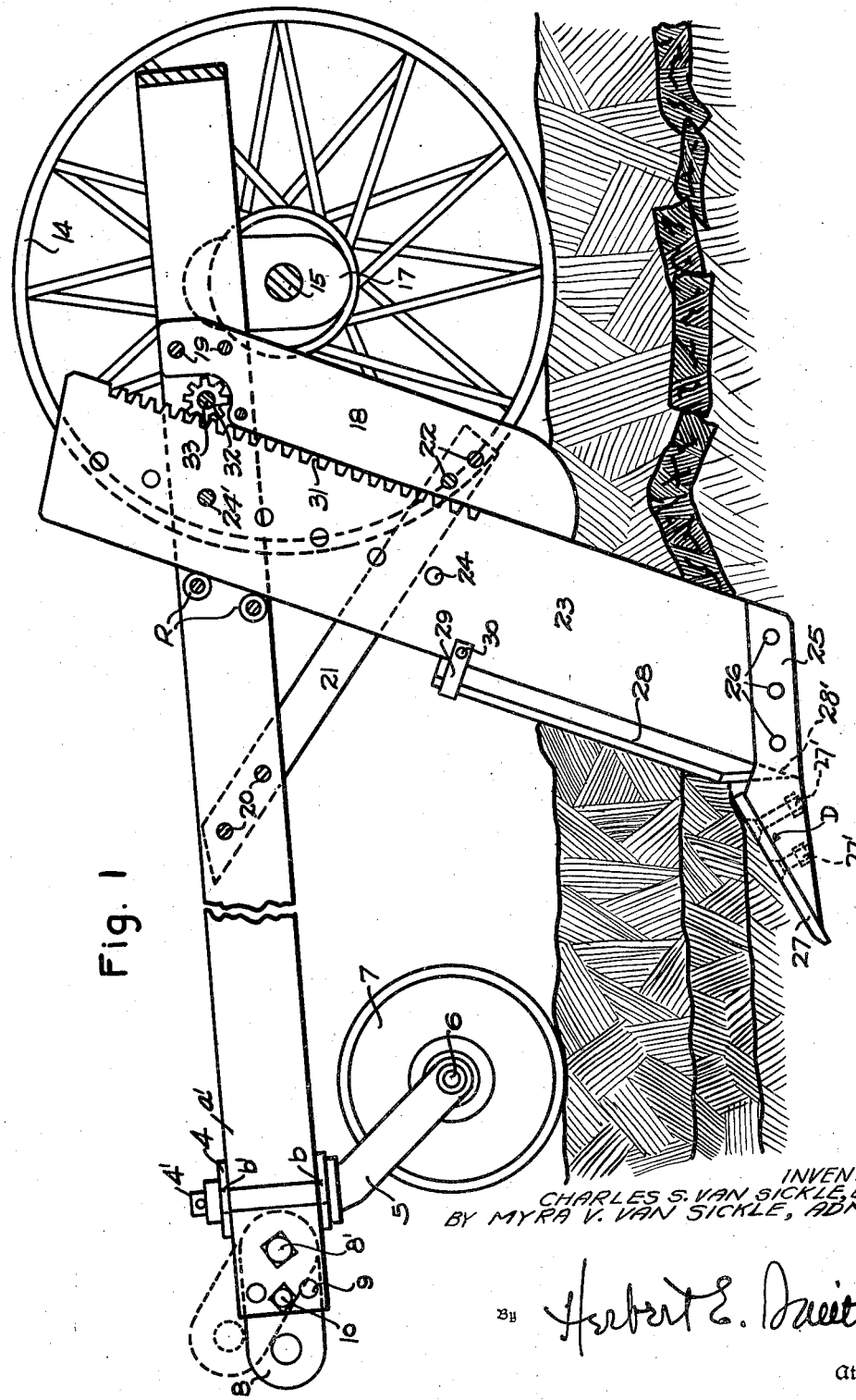
Fig. 1 is a vertical sectional view of the soil disrupter of the invention taken at line 1—1 of Fig. 2.
Figure 5:
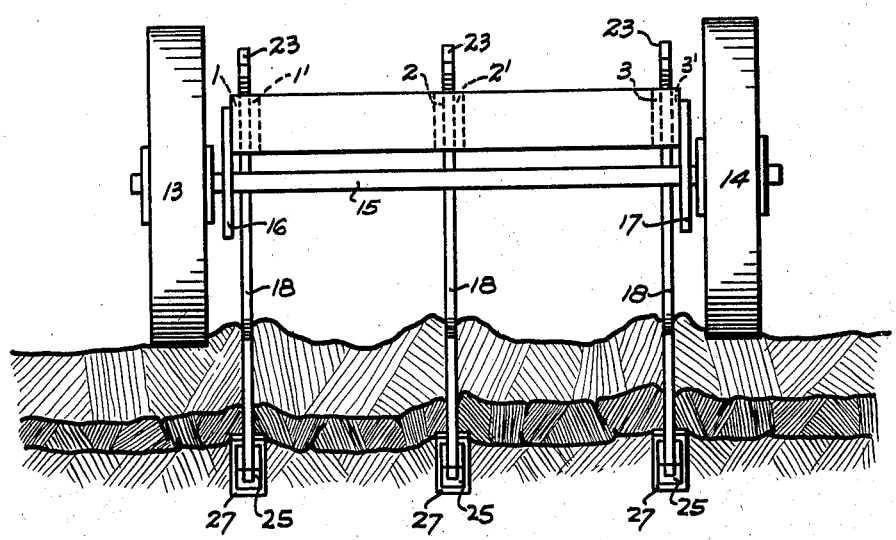
Fig. 5 is an end view of the soil disrupter.
Figure 6:
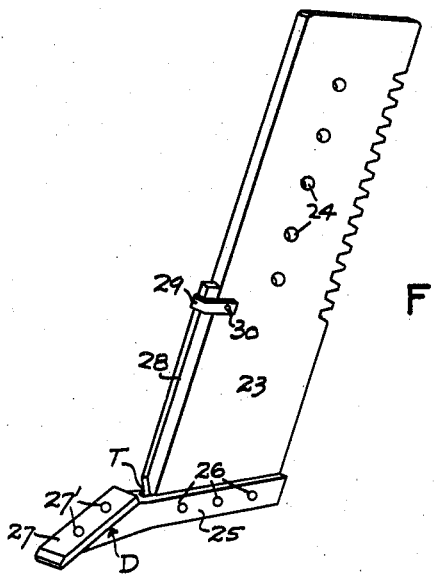
Fig. 6 is a perspective view of the plow.

Referring to Figures 1 and 2 of the drawings there is utilized a frame for the soil disrupter comprising the longitudinally extending arms or frame members 1—1', 2—2' and 3—3'. The forward ends of the arms 1 and 3' converge toward the front of the vehicle as at A and A' and are reinforced by braces B and B', and near their forward ends, A and A' the arms are formed parallel to each other as at $a$ and $a'$.

Secured upon the parallel portions $a$ and $a'$ there is provided a U-shaped bearing yoke 4 having bearing holes $b$ and $b'$. Journaled in bearing holes $b$ and $b'$ a swivel arm 4' is employed extending from the wheel supporting yoke 5 having mounted thereon the axle 6 and wheel 7. The wheel 7, of course, is rotatable and moves when the direction of the vehicle is changed.

Between the arms $a$ and $a'$, a draw bar 8 is secured by means of bolt 8', and by the use of holes 9 in the parallel arms $a$ and $a'$ and the bolt 10, the draw bar may be elevated or lowered to conform to the height of the tractor, or animal draft connection.

At the rear end of the vehicle frame the two wheels 13 and 14 are rotatably mounted on the axle 15, which extends transversely of the frame, and which is supported by means of the bearing plates 16 and 17 on frame members 1 and 3'.

Forward of the rear wheels there is provided a guide 18 secured by means of bolts 19 to the frame, and disposed downwardly and forwardly therefrom. Diagonally disposed from the frame and secured thereto by means of bolts 20 a brace 21 is provided for the guide 18, and this brace is rigidly secured to the guide as by bolts 22.

Immediately forward of the guide 18 the plow standard 23 is employed and this plow standard is adapted for vertical adjustment by means of holes 24 and bolt 24'. At the lower end of the plow standard there is utilized a plow shoe 25 slotted at T to slide upon the standard 23 and be rigidly secured thereto as by bolts 26. The front edge of the plow shoe 25 is beveled as at D and on this beveled face is mounted the cutting plate 27, which is retained by bolts 27'. This cutting plate 27 is adapted to depend into the earth, below the top soil, and "hard pan", and the angular disposition of the shoe causes the "hard pan" to break by forcing it up and away from the sub-soil.

On the forward face of the plow standard a vertical shearing or cutting plate 28 is affixed with its sharp cutting edge forward and this edge cuts into the "hard pan" previously broken by the cutting plate 27 on the plow shoe. The lower end of the plate 28 is pointed as at 28' to fit into the forward end of the slot T of the plow shoe. This shearing plate is retained in place on the plow standard by strap 29 and bolt 30.

On the rear edge of the plow standard 23 there is employed a series of teeth as 31 forming a rack and the rack is adapted for operating engagement with a pinion 32 rigidly secured to the lateral shaft 33.

A housing H on the frame encloses a pinion 34 also secured to the shaft 33, and a worm gear 35 and its shaft S in engagement with pinion 34 are also enclosed by the housing. The outer end of the shaft S terminates in a crank 36 with a suitable handle therefor.

Mounted on the frame and engaging the front face of the plow standard 23 rollers R are employed which in co-action with guide 18 retain the plow standard in place.

Thus it will be seen that to vary the depth of the subsoil plowing, or to raise the plow above the ground surface to transport the vehicle to another location, the bolt 24' is removed from the hole 24 of the plow standard 23, and the crank 36 may be manually revolved, whereupon the gears 35 and 34 rotate the shaft 33, which in turn rotates gear 32 and subsequently operates the rack and plow up or down depending upon the direction of movement imparted to the crank. The bolt 24' is then replaced and the plow will thus be retained in adjusted position.

It is believed apparent from the foregoing description that through the use of the plow according to the invention, the "hard pan" will be broken and that moisture may seep through the top soil and into the subsoil, which while not having great plant-growing capacities, retains the moisture, and gradually releases it to the topsoil during dry periods.

It has been found that there are several advantages in placing the wheels behind the plows, one being that it allows the machine to be turned to follow the ground contour while the plow is in the ground. Another advantage resides in the fact that by having the wheels to the rear they can be utilized to remove the trash that gradually builds up on the plow beam between the ground surface and the frame of the machine. This trash consisting of stubble, weeds, roots with soil clinging to them frequently will weigh a hundred pounds or more in front of each plow. When it reaches a certain point in build up, if not removed, it starts to gouge out the ground which increases the draft necessary to pull the subsoiler through the ground and which is also detrimental to the surface of the ground.

By placing the wheels to the rear it is found that the wheels will run over the outer edge of the last of the trash as it forms and tear off enough of the material across the point of the plow so that the trash will remove itself.

Further, if the wheels are placed ahead of the plow when a turn ahead has to be made the plow would have to shift sideways in the ground which would be an impossibility. By pivoting on the plow, as is provided, the wheels trailing behind will follow the plow and save breakage.

Having thus fully described the invention what is claimed as new and desired to be secured by Letters Patent is:

The combination with a frame having an adjusting bolt therethrough, and supporting wheels for said frame, of a plow stock forward of said wheels and having a vertical series of openings therethrough adapted for co-action with said bolt for maintaining the vertical adjustment of the plow and provided with a rack on its rear edge, a depending rear guide plate for the plow stock, the upper portion thereof being rigid with the frame and the lower portion being connected by a diagonally extending brace with said frame and said guide plate having a cut-out portion adjacent the top thereof, an operating shaft journaled in said frame, a pinion mounted on said shaft and positioned within said cut-out portion and operatively engaging said rack, a pair of guide rollers on said frame engaging the forward edge of said stock, a second pinion on said shaft, and a worm gear and its crank shaft meshing with said pinion.

MYRA V. VAN SICKLE.
*Administratrix of the Estate of Charles S. Van Sickle, Deceased.*